United States Patent [19]

Von Thun

[11] Patent Number: 4,939,985
[45] Date of Patent: Jul. 10, 1990

[54] TEST BENCH FOR TESTING THE DRIVE TRAIN OF A VEHICLE

[75] Inventor: Hans-Jürgen Von Thun, Hemsbach, Fed. Rep. of Germany

[73] Assignee: Asea Brown Boveri Aktiengesellschaft, Mannheim, Fed. Rep. of Germany

[21] Appl. No.: 337,561

[22] Filed: Apr. 12, 1989

[30] Foreign Application Priority Data

Apr. 16, 1988 [DE] Fed. Rep. of Germany ....... 3812824

[51] Int. Cl.$^5$ ........................................... G01M 19/00
[52] U.S. Cl. ................................................. 73/118.1
[58] Field of Search ................... 73/118.1, 117, 862.11, 73/862.17

[56] References Cited

U.S. PATENT DOCUMENTS

3,363,455 1/1968 Vanderbilt, Jr. .................... 73/118.1
3,712,127 7/1973 Petersen ............................. 73/181.1

Primary Examiner—Jerry W. Myracle
Attorney, Agent, or Firm—Herbert L. Lerner; Laurence A. Greenberg

[57] ABSTRACT

A test bench for testing a drive train of a test vehicle from an internal combustion engine up to drive shafts for wheels includes an electronic function element or computer simulating moments of inertia, spring stiffnesses, and damping masses. The electronic function element or computer simulates the wheels and a vehicle acceleration process, with the exception of actually present vehicle components. At least two mutually independent moment-regulated electric load machines serve as a transmission element between the electronic function element or computer and the test bench having the test vehicle. The load machines are flanged directly to the drive shafts of the drive train to be tested.

7 Claims, 7 Drawing Sheets

TEST BENCH FOR TESTING THE DRIVE TRAIN OF A VEHICLE

The invention relates to a test bench for testing the drive train of a vehicle from the internal combustion engine as far as the drive axles, wherein moments of inertia, spring stiffnesses, and damping masses are simulated by means of electronic function elements or by means of a computer, and at least one moment-regulated electric load machine serves as a transmission element between the electronic function elements or computer and the test bench having the test subject.

A test bench of this kind for testing the drive train of a vehicle is known from German Published, Non-Prosecuted Application DE-OS 34 16 496, which describes a method for simulating moments of inertia on test benches with electronic function members and with a moment-regulated electric machine and a transmission member between the electronic function members and the test bench with the test subject thereon, in which the test bench rpm is measured and used for regulating the electric machine. The mass of the test subject and the mass of the test bench are connected to one another through an elastic shaft and are considered as mechanical mass oscillators. What is simulated is at least a mass of magnitude equivalent to the moment of inertia to be simulated.

The moment of inertia to be electronically simulated is adjusted integrally with a time constant that is proportional to the moment of inertia to be simulated. A spring stiffness between the moment of inertia to be simulated and the mechanical mass oscillator is adjusted integrally with a time constant in such a way that the spring stiffness is equivalent to the natural oscillation behavior of the mass system to be simulated. Furthermore, the damping of the mass system is adjusted proportionally with a gain in such a way that it is equivalent to the natural oscillation behavior to be simulated of the mass system to be simulated.

However, such a device does not provide a dynamic trial with real-time simulation of the vehcle behavior (simulation of running resistances and of the moments of acceleration and deceleration).

It is accordingly an object of the invention to provide a text bench for testing the drive train of a vehicle, which overcomes the hereinafore-mentioned disadvantages of the heretofore-known and devices of this general type and with which a dynamic trial with real-time simulation of the vehicle behavior is possible.

With the foregoing and other object in view there is provided, in accordance with the invention, a test bench for testing a drive train of a test vehicle from an internal combustion engine up to drive shafts or axles for wheels, comprising an electric function element or computer simulating moments of inertia, spring stiffnesses, and damping masses, the electronic function element or computer simulating the wheels and a vehicle acceleration process, with the exception of actually present vehicle components, and at least two mutually independent moment-regulated electric load machines serving as a transmission element between the electronic function element or computer and the test bench having the test vehicle or subject, the load machines being flanged directly to the drive shafts of the drive train to be tested.

The advantages attainable with the invention are in particular that simulation of the wheels and of the vehicle acceleration behavior takes place directly on the drive shafts, without using rollers. In this process, only those elements that in actuality are not present as vehicle components are simulated, while the main drive train, the axle gear, the driving shafts, the clutch, the transmission and the internal combustion engine are taken into account in terms of their actual behavior.

This rollerless testing directly at the drive shafts advantageously makes it possible to perform systematc and highly replicable testing of spinning or locking wheels, with their effects on the drive train and on the longitudinal motion of the vehicle. Instead of the laborious preparation of skid plates, as in the previously conventional road test, the invention makes it possible to specify and reproduce arbitrary skid conditions in the simplest manner, by specifying parameters. Studies of anti-skid or anti-locking and traction control systems on the test bench thus become possible.

In accordance with another feature of the invention, the running resistance moment, reduced by the wheel moments, is carried to a first integrator having a time constant proportional to the vehicle moment of inertia, wherein the angle speed proportional to the vehicle speed can be picked up.

In accordance with a further feature of the invention, for wheel moment simulation, the angle speed reduced at first comparison points by the wheel rpm is carried with a time constant proportional to the tire elasticity and respective parallel-connected first proportional elements with a gain factor proportional to the tire damping, to a second integrator, wherein the respective output signals of the second integrators and the first proportional elements are summed up to make the wheel moment.

In accordance with an added feature of the invention, for simulating cornering by the vehicle, third proportional elements are each provided with respective different gain factors for the wheels on the inside of the curve and the wheels on the outside of the curve, between a first integrator and the respective first comparison point.

In accordance with an additional feature of the invention, for the simulation of different wheel radii, respective fourth proportional elements each with different gain factors are provided for each individual wheel between the first integrator and the respective first comparison point.

In accordance with yet another feature of the invention, for the simulation of the kinematic slip, respective multipliers are provided, which multiply a slip separately specifiable for each wheel by the angle speed, wherein the angle speed in each case is reduced by the obtained product in respective second comparison points, and the respective second comparison points specify the respective wheel rpm to the respective first comparision points.

In accordance with yet a further feature of the invention, for the simulation of spinning or locking wheels, the wheel moments are each limited by means of limiting elements.

In accordance with a concomitant feature of the invention, the slip moment utilized for the limitation is formed as a function of the coefficient of adhesion between the tires and the road surface, the tire contact force and the wheel radius.

Other features which are considered as characteristic for the invention are set forth in the appended claims.

Although the invention is illustrated and described herein as embodied in a text bench for testing the drive train of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
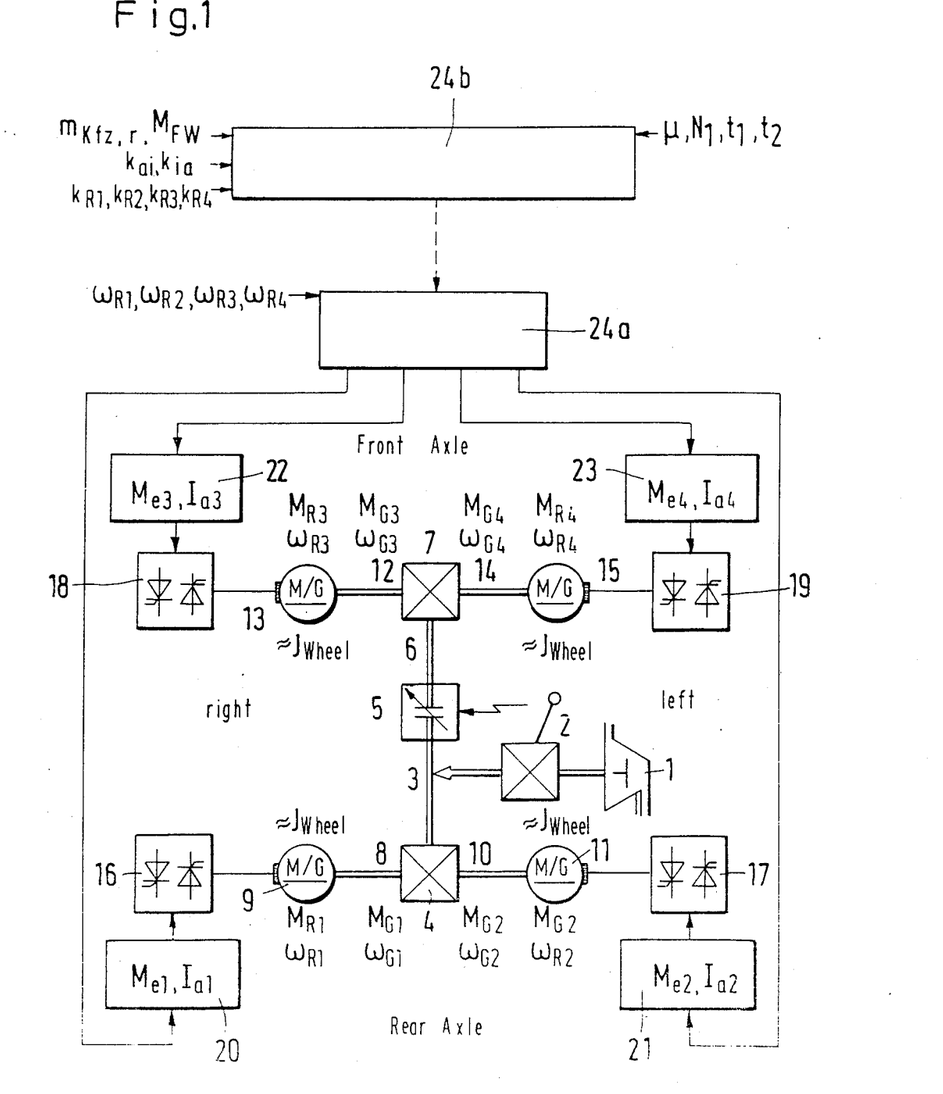
FIG. 1 is an overall schematic circuit diagram of a test bench (with a four-wheel drive test bench as an example)

Referring now to the figures of the drawing in detail and first, particularly, to FIG. 1 thereof, there is seen a general circuit diagram of a test bench. A four-wheel-drive test bench is shown, but the test bench may equally well be constructed as a two-wheel-drive test bench. An internal combustion engine 1 can be seen, which is connected through a transmission 2 to a main drive train 3. The main drive train 3 drives a rear axle gear 4 directly, and drives a front axle gear 7 through a clutch 5 and a secondary drive train 6 (there is clutch-controlled moment distribution between the front and rear axles, as well as permanent drive moment induction into the rear axle). The rear axle gear 4 is connected through a shaft 8 (for instance, the original axle shaft, left rear) with a load machine 9 (wheel drive, left rear) as well as through a shaft 10 (for instance, the orginal axle shaft, left rear) with a load machine 11 (wheel drive, left rear). The front axle gear is connected through a shaft 12 (for instance, the original axle shaft, right front) with a load machine 13 (wheel drive, right front) as well as through a shaft 14 (for instance, the original axle shaft, left front) with a load machine 15 (wheel drive, left front).

The axle drive moments at the shafts 8, 10, 12, 14 are symbolized as $M_{G1}$, $M_{G2}$, $M_{G3}$, $M_{G4}$, and the associated axle drive angle speed or axle drive rpm are designates as $\omega_{G1}$, $\omega_{G2}$, $\omega_{G3}$, $\omega_{G4}$. The wheel moments of the load machines 9, 11, 13, 15 are designated as $M_{R1}$, $M_{R2}$, $M_{R3}$, $M_{R4}$, and the allowable wheel angle speeds or wheel rpm (actual rpm values) are designated as $\omega_{R1}$, $\omega_{R2}$, $\omega_{R3}$, $\omega_{R4}$. The moments of inertia of the load machines 9, 11, 13, 15 are equivalent to the wheel moments of inertia $J_{Wheel}$.

As can be seen, instead of the wheels, the electric machines used as load assemblies (load machines 9, 11, 13, 15) are flanged directly to the shafts of the drive train. They are freely positionable on a base plate, in order to accommodate the dimensions of various types of vehicles. The test bench is mechanically constructed in terms of its power and control of operational mode in such a way that four-wheel or two-wheel-drive vehicles can be tested selectively. There are no restrictions in terms of type and location of the induction of drive moment. Thus the internal combustion engine may, for instance, be replaced by an electric machine. There are also no restrictions in terms of the moment distribution between the drive axles.

Each of the four load machines 9, 11, 13, 15 must be able to brake and drive independently of one another, in order to simulate the running resistances and the moments of acceleration and deceleration (torsion loads) at the four drive shafts of the vehicle. Since the vehicle on the test bench does not undergo any translational motion, the forces or moments of deceleration at the drive shafts, which are dependent on the vehicle mass, must be simulated by the load machines. In comparison to the stationary ad quasi-stationary running resistance, these moments change very quickly. In order to ensure their temporally correct simulation, load machines having very quickly variable drive and brake moments must be used. An important factor in this case is not only the rapid change in torque in the braking quadrant or drive quadrant, but also the rapid transition from braking moment to drive moment, and vice versa. These conditions are best met, in the power range necessary, by direct-current, short-circuit generators.

The load machines 9, 11, 13, 15 are supplied from a non-illustrated source of three-phase current by static converters 16, 17, 18, 19. Regulating devices 20, 21, 22, 23 are provided for regulating to the internal machine moments (torques) $M_{e1}$, $M_{e2}$, $M_{e3}$, $M_{e4}$ and to the armature currents $J_{a1}$, $J_{a2}$, $J_{a3}$, $J_{a4}$ of the load machines 9, 11, 13 15. A simulation computer 24a capable of being influenced by an overriding master computer 24b triggers these regulating devices (20, 21, 22, 23).

The moments $M_{e1}$, $M_{e2}$, $M_{e3}$, $M_{e4}$ are the dynamically correct variables needed for the simulation (simulation of the running resistance, that is the solution to the differential equation system given below for the longitudinal motion of the vehicle by the simulation computer 24a). The moments $M_{e1}$, $M_{e2}$, $M_{e3}$, $M_{e4}$ are practically independent of the mechanics of the test bench and test subject. The natural frequency of the mechanics and backlash in the test subject have no effect on the torque regulating dynamics. The only possible disadvantage of the DC generator which, however, may be overcome, may appear in the simulation of the spining or locking wheels to be described below: Generally, the moment of inertia of the armature and the coupling elements is greater than the wheel moment of inertia of the vehicle to be tested. This disadvantage can be minimized by a suitable selection of the machines (low-inertia, slender structural shape), or can be eliminated entirely by reducing the moment of inertia by means of adaptation gears. The backlash in an accelerator gear with little backlash is negligible compared to the backlash in the test subject (differentials, gears, cardan shafts).

The test bench control and parameter setting of the simulation model is effected from the overriding master computer 24b. Instead of describing the translational vehicle motion in the X-Y plane, the following observations should be performed, for the sake of simplcity, for rotational motion on the drive axles. All moments, rpms nd moments of inertia can be calculated back into forces, speeds and masses through the wheel radii r.

The moment of acceleration is obtained from the external stationary and quasi-stationary running resistance moments $$M_{FW} = b_0 + b_1\omega_{Kfz} + b_2\omega^2_{Kfz}$$

(where angular speed $\omega_{Kfz} = V_{Kfz}/r$, $V_{Kfz}$=vehicle speed, r=wheel radius, $b_0$, $b_1$, $b_2$ are the coefficients for the stationary and quasi-stationary pitch, roll and air resistances) and from the drive moment that the four drive shafts transmit to the roadway, through the tires. The moment of inertia of the vehicle (vehicle mass-equivalent moment of inertia)

($m_{Kfz}$=vehicle mass)

is thus accelerated or decelerated.

Figure 2:
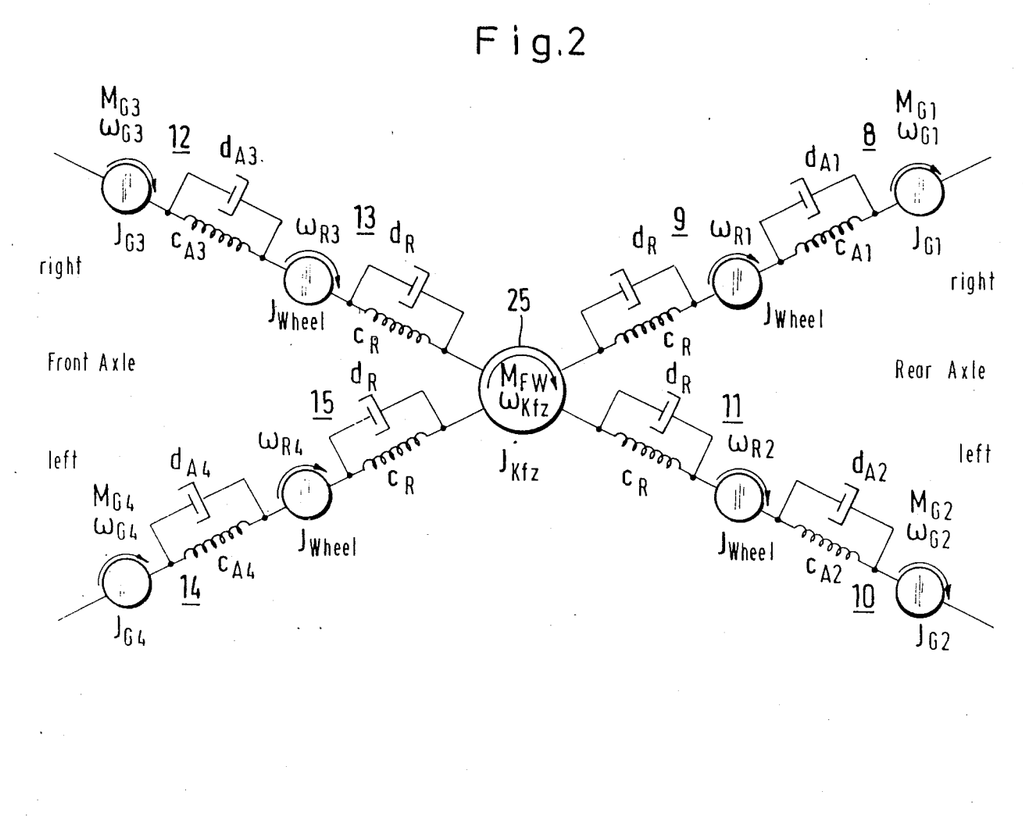
FIG. 2 is a circuit diagram of a mechanical substitute for the drive (four-wheel drive)

In the case of this free straigh-ahead travel, a mechanical substituted diagram for the drive (four-wheel drive) of FIG. 2 can be used: A vehicle 25 has a moment of inertia $J_{Kfz}$ of the vehicle at the point of intersection of the four driven wheels (load machines 9, 11, 13, 15; wheel angle speeds $\omega_{R1}, \ldots, \omega_{R4}$) which is engaged by the drive moments, and transferred from the tire stiffness $c_R$ and tire damping $d_R$ and the external running resistance moment $M_{FW}$ (angular speed $\omega_{Kfz}$).

The drive moments (axle drive moments $M_{G1}$, $M_{G2}$, $M_{G3}$, $M_{G4}$, axle drive angular speeds $\omega_{G1} \ldots \omega_{G4}$) are transmitted to the four-wheel drive moments of inertia $J_{Wheel}$ through the four drive shafts (shafts 8, 10, 12, 14) with their elasticities (spring constants of the axle drive) $c_{A1}$, $c_{A2}$, $c_{A3}$, $c_{A4}$ and dampings (damping mass of the axle drive) $d_{A1}$, $d_{A2}$, $d_{A3}$, $d_{A4}$ from the four axle gear outputs having the moments of inertia $J_{G1}$, $J_{G2}$, $J_{G3}$, $J_{G4}$.

The drive shafts (shafts 8, 10, 12, 14) are actually present in the test subject, as are the components located farther inside the drive train (front axle gear 7, secondary drive train 6, rear axle gear 4, main or primary drive train 3, as well as the internal combustion engine 1, transmission or gearing 2 and clutch 5). They need not be simulated in the ensuing simulation of models. The mechanical substitute diagram and the ensuing differential equation system are therefore broken off at the axle gear output.

In the case of the vehicle model to be simulated, a linear system is assumed: in other words a linear spring characteristic and speed-proportional damping for tires and axle shafts. From this assumption, the differential equation system for the translational vehicle motion is obtained (represented as $\omega_{Kfz}$ rather than $V_{Kfz}$). The graphic representation of the differential equation system as a signal flow chart, or in other words the motion equation system of the drive shafts of the vehicle (four-wheel-drive vehicle), is provided in FIG. 3.

In this case, the output signal $\omega_{Kfz}$ of an integrator 26 (time constant proportional to $J_{Kfz}$) is delivered to a comparison point 27. On the input side, the integrator 26 is provided with the dfferential signal $M_{FW}$-$M_{R1}$-$M_{R2}$-$M_{R3}$-$M_{R4}$ formed by means of a comparison point 39. The comparision point 27 forms the difference $\omega_{Kfz}$—$W_{R1}$ and delivers it to an integrator 28 (time constant proportional to $c_R$) as well as to a parallel-connected proportional element 29 (again proportional to $d_R$). The output signals of these components 28, 29 are added up at a summation point 30, the output signal $M_{R1}$ of which is furnished to the comparison point 39 and to a comparison point 31. The comparision point 31 forms the difference $M_{R1}$—$M_{Shaft1}$ ($M_{Shaft}$=shaft moment) and carries it to an integrator 32 (time constant proportional to $J_{Wheel}$). The output signal $\omega_{R1}$ of the integrator 32 is carried to the comparison point 27 and to a comparison point 33. The comparision point 33 forms the difference $\omega_{R1} - \omega_{G1}$ and carries it to a proportional element 34 (gain proportional to $d_{A1}$) as well as to a parallel integrator 35 (time constant proportional to $c_{A1}$). The output signals of these components 34, 35 are added in a summation point 36. The output signal $M_{Shaft1}$ of the summation point 36 is carried to the comparison point 31 and to a comparison point 37. The comparison point 37 forms the difference $M_{Shaft1} - M_{G1}$ and carries that to an integrator 38 (time constant proportional to $J_{G1}$). The output signal $\omega_{G1}$ of the integrator 38 is carried to the comparison point 33. The graphic representation of the differential equation system, which is explained below by taking the right rear axle as an example, can be developed in the same manner for the left rear axle, right front axle, or left front axle, as suggested in FIG. 3.

Figure 3:
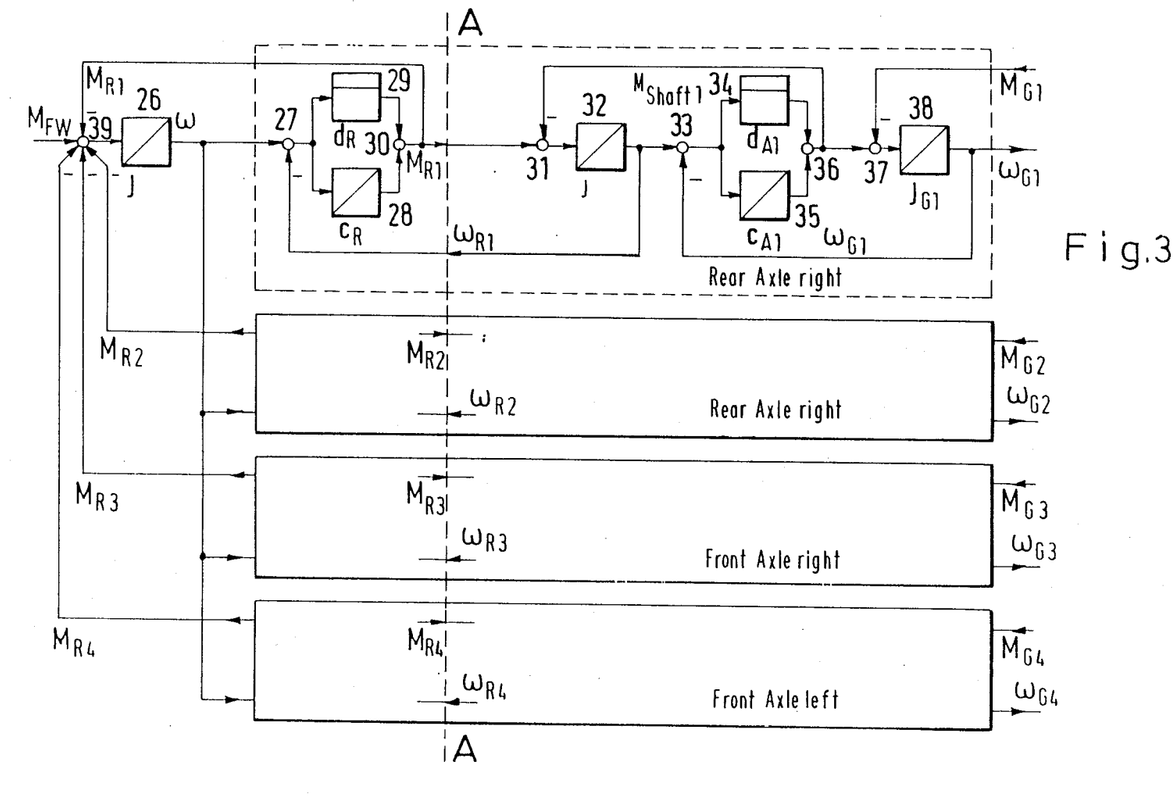
FIG. 3 is a circuit diagram of a motion equation system of drive shafts of the vehicle (four-wheel drive vehicle)

In the simulation model of FIG. 3, the wheel moments of inertia $J_{Wheel}$ are mechanically simulated by adaptation of the machine moments of inertia (for the load machines) to the moments of inertia $J_{Wheel}$ for the wheel.

The differential equation components on the left of the dividing line (interface) AA is solved on-line in the fast simulation computer 24a. The four actual rpm values $\omega_{R1}$-$\omega_{R4}$ are fed into the simulation computer 24a. They are measured at the four load machines. The simulation computer 24a furnishes the four set-point torque values $M_{R1}, \ldots, M_{R4}$ from the four actual rpm values, through the simulation model on the left of the dividing line AA. These values must be built up as an actual value in the load machines, through the four fastest-possible torque regulating circuits (regulating devices 20–23). This changes the ideal simulation model of FIG. 3 into the actual simulation model of FIG. 4.

Figure 4:
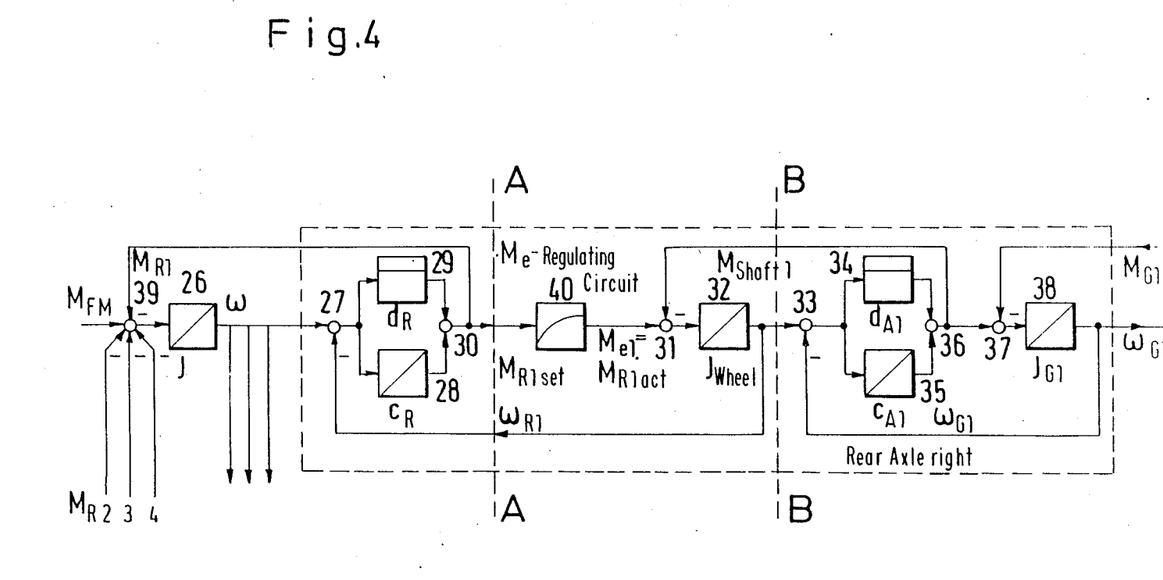
FIG. 4 is a circuit diagram showing the simulation of one half of a drive axle with a torque-regulated direct current generator and simulation computer.

FIG. 4 shows the simulation of one drive axle half with a torque-regulated DC generator and simulation computers. The torque regulating circuit belonging to one drive shaft is shown as substitute low-pass filter. In the same way, the torque regulating circuits for the other drive shafts can be represented in the differential equation systems as substitute low-pass filters. The substitute low-pass filter for the $M_{el}$ regulating circuit (right rear axle) is identified in FIG. 4 by reference numeral 40. The substitute low-pass filter (or torque regulating circuit) 40 is disposed between the summation point 30 and the comparision 31. The wheel moment $M_{R1}$ is carried in the form of a wheel moment set-point value $M_{R1set}$ to the torque regulating circuit, shown as the substitute low-pass filter 40. On the output side, this regulating circuit 40 emits the wheel moment actual value $M_{Ract} = M_{el}$ to the comparison point 31. The rest of the configuration is as described in connection with FIG. 3. The portion of the differential equation on the left of the dividing line AA is solved in the simulation computer 24a, as already noted. The portion of the differential equation between the dividing lines AA and BB corresponds to the portion of the load machines + static converter + regulating device (Me regulation). The part of the differential equation to the right of the dividing line BB corresponds to the test subject part.

The torque regulating circuits (for instance, the substitute low-pass filter 40) do not limit the simulation dynamics, as long as their limit frequency is high enough is comparision with the desired simulation dynamics. It can also be seen from FIG. 4 that the load machines must be regulated to their internal torque $M_{el}$ ... $M_{e4}$. It is also quite clear from the drawing that the use of measuring shafts would mean a regulation to $M_{Shaft1}$ ... $M_{Shaft4}$, which would result in a considerable structural falsification of the simulation model.

In cornering, only the acceleration components of the translational vehicle motion in the X-Y plane are taken into account. Yaw moments are negligible, given the cornering radii and accelerations about the Z axis (this situation is in contrast to that with tracked vehicles, in which these factors are not negligible). From the simulation model of FIG. 3 or FIG. 4, one simple possibility for curve simulation is thus possible.

The angle speeds $\omega_{R1}$, $\omega_{R3}$ for the wheels on the inside of the curve and $\omega_{R2}$, $\omega_{R4}$ for the wheels on the outside of the curve, or vice versa, are obtainable from the vehicle speed and the curve geometry.

Figure 5:
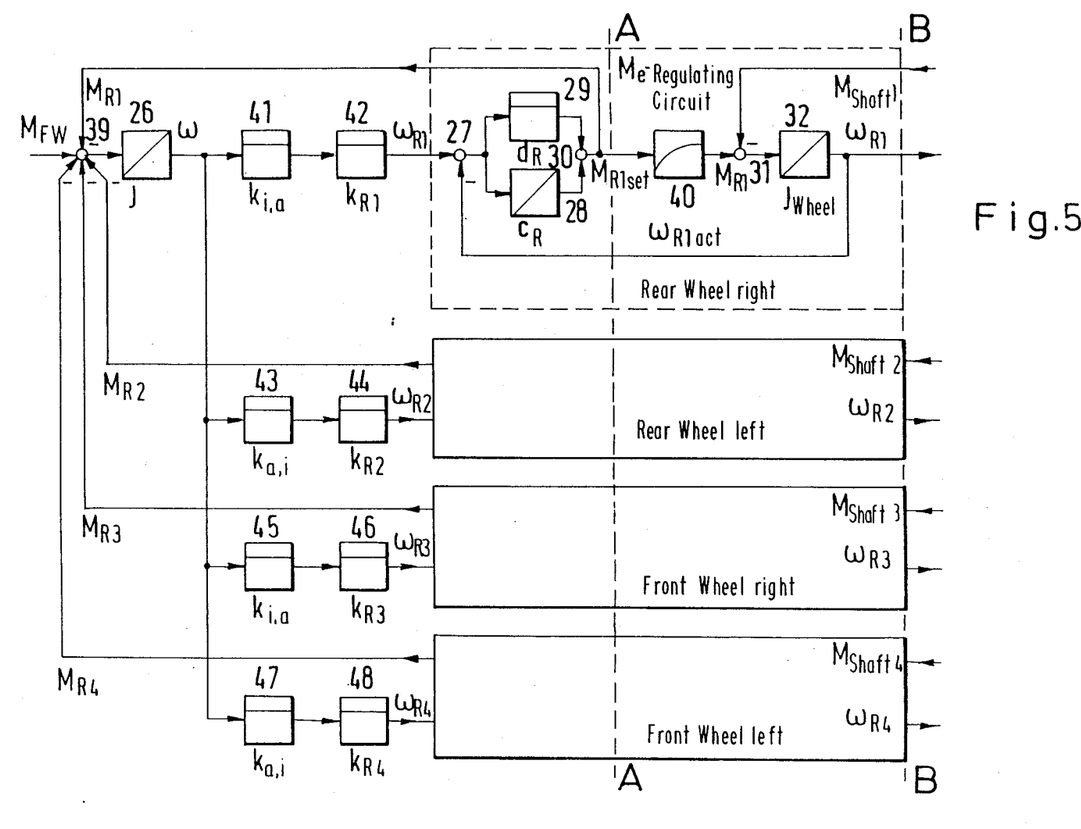
FIG. 5 is a circuit diagram showing the simulation of cornering and different wheel radii.

In FIG. 5, the simulation of cornering and different wheel radii is shown. Cornering is simulated by four proportional elements 41, 43, 45, 47 between the integrator 26 and the comparison point 27 (or other comparison points of the remaining differential equation systems) with the gain factors for cornering of $k_{i,a}$ (for 41 or 45 or in other words for the right wheel or right front wheel) and $k_{a,i}$ (for 43 or 47 or in other words the left rear wheel or the left front wheel). With suitable specification of parameters, the simulation model changes to that for straight-ahead travel. The parameters are specified by the operator through the master computer 24b, as a function of time as needed.

With the wheels not slipping, different wheel radii at the front and rear axle result in differential rpms between the front and rear axle. The differences in rpm, which result at the various drive shafts because of different wheel radii, including tires worn down to different extents, are specified in the simulation model by means of four proportional elements 42, 44, 46, 48 between the integrator 26 and the comparison point 27 (or further comparison points of the remaining differential equation systems) with the gain factors for different wheel radii $k_{R1}$, $k_{R2}$, $k_{R3}$, $k_4$.

Accordingly, with a suitable specification of data, compensating motion takes place in the axle gears, and a differential rpm is established between the front and rear axle. The gain factors $k_{R1}$ ... $k_{R4}$ are specified by the operator through the master computer 24b (see FIG. 1). As FIG. 5 also shows, cornering and dissimilar wheel radii can be specified simultaneously, in order to study their combined influence on the test subject. In that case, one proportional element for cornering and one proportional element for dissimilar wheel radii are connected in series.

Figure 6:
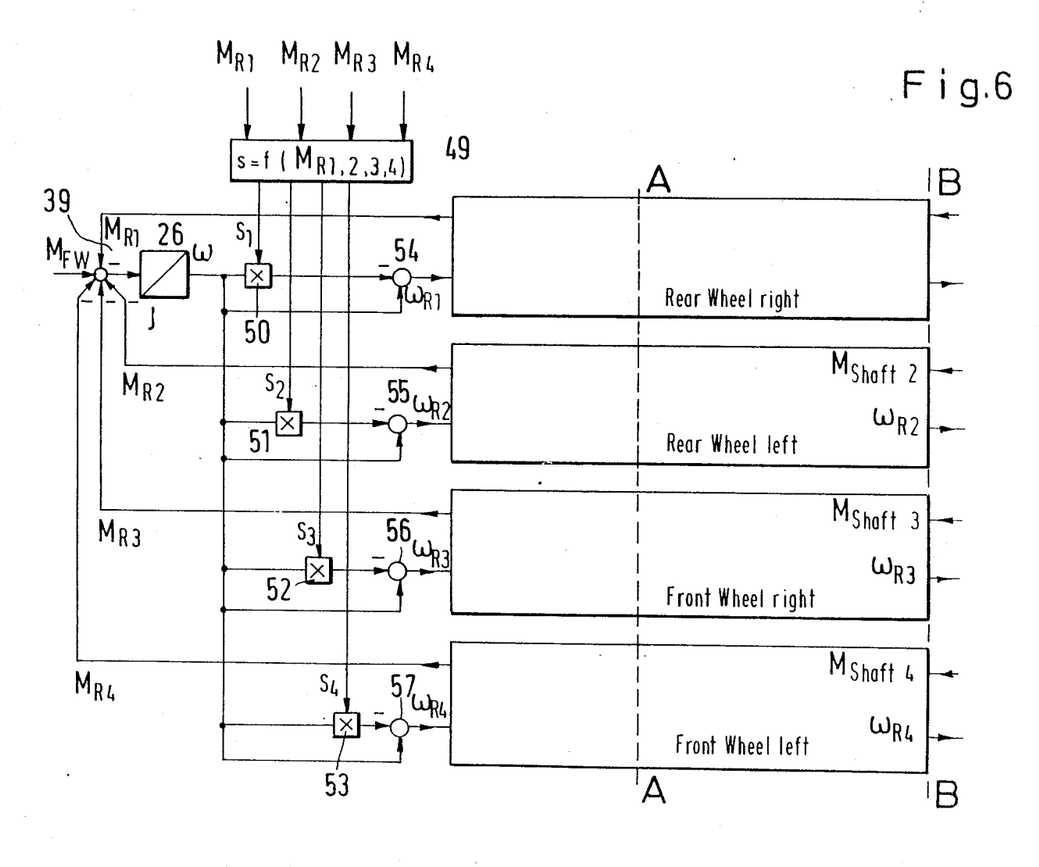
FIG. 6 is a circuit diagram showing the simulation of slip.

In FIG. 6, the simulation of the slip is shown. In an actual vehicle, the tire slip, which may be the same for all wheels, has an additional slip superimposed on it, which is the so-called kinematic slip, that is created by the kinematic conditions at the wheels. This kinematic slip prevents excessive axle canting in the vehicle. Without kinematic slip, even the least deviations in wheel radii cause axle canting until the blocking moment in the axle gear is exceeded and the rpm difference, integrated with the angle of torsion, is compensated for. In the vehicle without slip, when driving straight ahead, a sawtooth-like fluctuation in moment would thus take place.

The same effect arises at the test bench in the simulation of straight-ahead travel with equal wheel radii, if kinematic slip is not simulated. In the unblocked axle gear, the sawtooth-like moment fluctuation arises, and with the blocked differential, the machines run up to their maximum (opposed) moments. On the test branch, this effect is brought about by errors, for instance in rpm detection. Since values of $\omega_{R1}$, $\omega_{R2}$, $\omega_{R3}$, $\omega_{R4}$ that are absolutely of equal magnitude cannot be measured and regulated in stationary operation, even if maximum care is taken, integration of the rpm differences and therefore canting angles and moments do occur (the more accurately the rpm values agree, the lower the frequency of the sawtooth oscillation). In order to prevent this undesirable canting of the drive train on the test bench as well, the kinematic slip can and must be simulated. The reference variable selected for the slip is $\omega_{Kfz}$, so that the slip obtained for the four-wheels is $$s_{1,2,3,4} = \frac{\omega_{Kfz} - \omega_{R1,2,3,4}}{\omega_{Kfz}}$$

The wheel rpms $\omega_{R1}$, $\omega_{R2}$, $\omega_{R3}$, $\omega_{R4}$ then become as follows:

$$\omega_{R1,2,3,4} = \omega_{Kfz}(1 - s_{1,2,3,4}).$$

FIG. 6 shows the associated simulation circuit. To this end, the slip $s_1$, $s_2$, $s_3$, $s_4$ is calculated as a function of the wheel moments $M_{R1}$, $M_{R2}$, $M_{R3}$, $M_{R4}$ by a computer 49 and is specified to multipliers 50, 51, 52, 53. The respective multipliers 50, 51, 52, 53 form the product $\omega_{Kfz} \cdot s_1$, $\omega_{Kfz} \cdot s_2$, $\omega_{Kfz} \cdot s_3$, $\omega_{Kfz} \cdot s_4$, respectively, and supply these products to comparison points 54, 55, 56, 57. The various comparison points form the following differences:

$$\omega_{R1} = \omega_{Kfz} - \omega_{Kfz} \cdot s_1,$$

$$\omega_{R2} = \omega_{Kfz} - \omega_{Kfz} \cdot s_2,$$

$$\omega_{R3} = \omega_{Kfz} - \omega_{Kfz} \cdot s_3,$$

$$\omega_{R4} = \omega_{Kfz} - \omega_{Kfz} \cdot s_4.$$

The computer 49 and multipliers 50-53 may be components of the simulation computer 24a, but the computer 49 may also be included in the master computer 24b.

The slip $s_1$ ... $s_4$ can be calculated in various ways, for example in such a way that the operator can specify adherence to certain moment distributions in the drive train through the master computer 24b.

At first glance it would seem obvious to use the simulation circuit for the kinematic slip described in FIG. 6 for the spinning or locking wheel as well. One could imagine calculating the slip as s(t) in such way that the wheel runs up or is slowed down with a certain rpm graident. However, that method has the disadvantage of requiring the distribution of moment in the drive train during the slipping to be known in order to be able to utilize the expected moment balance at the slipping wheel for calculating the rpm gradient. Yet it is precisely this distribution of moment that is to be studied, especially if blocking means are to be actuated during the spinning. It should also be noted that the spinning or locking of a wheel is a very rapid process, and therefore for reasons of simulation dynamics as well, this proces should not take place through an rpm regulation.

Figure 7:
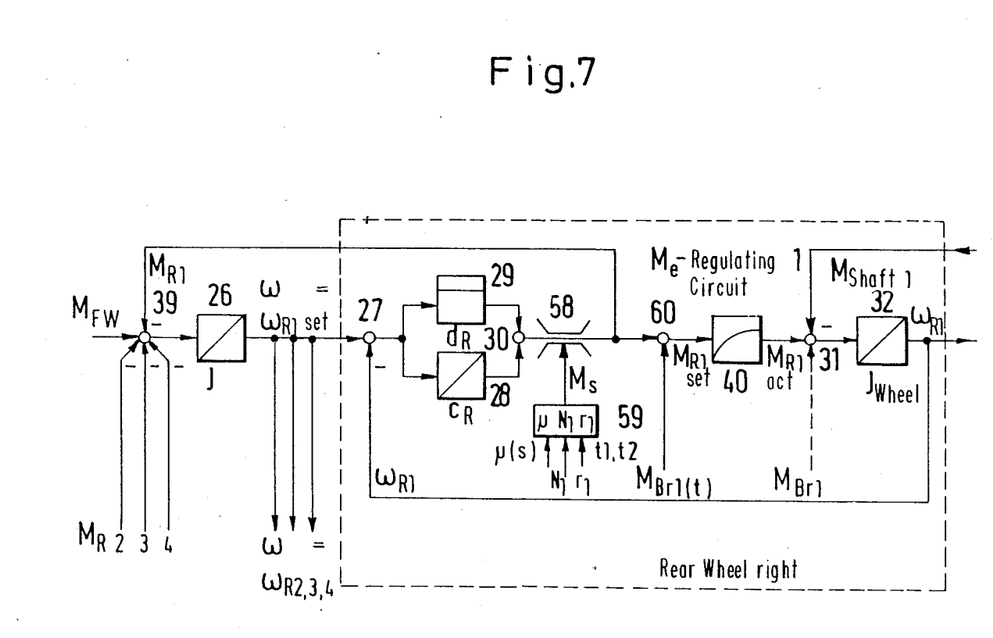
FIG. 7 is a circuit diagram showing the simulation of the spinning and locking wheel.

The simulation of the spinning and locking wheel shown in FIG. 7 taking one wheel as an example therefore provides for simulation of the spinning or locking wheel at the physically correct point: Only the moment that is less than the slip moment (moment of adhesion, moment of sliding) $\mu$. $N_1 r_1$ can be transmitted from the tire to the road surface.

$$d_R(\omega_{Kfz} - \omega_{R1}) + c_R \int (\omega_{Kfz} - \omega_{R1}) dt < \mu N_1 r_1$$

where $\mu$ = the coefficient of adhesion and $N_1$ = the tire contact force.

This inequality is shown in FIG. 7 taking a driven wheel (for example the right rear wheel) as an example. The configuration of FIG. 7 corresponds to that of FIG. 4, with a limiter 58 for limiting the value $M_{R1set}$ to the slip moment $M_s$ provided between the summation point 30 and the torque regulating circuit 40. The slip moment $M_s$ is determined by means of a computer 59 from the coefficient of adhesion $\mu$, the tire contact force $N_1$ and the wheel radius $r_1$ (right rear wheel). If the moment $M_{Shaft1}$ transmitted from the first drive shaft to the first tire is greater than $\mu \cdot N_1 r_1$, then the PI (Proportional/Integral) algorithm runs up to the limit. Thus only $M_{Shaft1} - \mu N_1 r_1$, as the acceleration moment, engages the wheel moment of inertia, and the wheel spins.

The operator initiates the spinning, by using the master computer 24b to reduce the limitation of the coefficient of adhesion $\mu$ for a road surface with a good grip to the coefficient of adhesion $\mu$ for a smooth road surface (for instance, an icy patch). At the end of the icy patch, the coefficient of adhesion $\mu$ is increased as a function of slip so that the wheel is once again synchronized.

Upon reduction of the drive moment (letup on the gas, incipient blocking actions in the axle gears) to values less than the slip moment $M_s = \mu N_1 r_1$, the wheel is synchronized again. The wheel once again transmits the drive moment.

As FIG. 7 shows, as in the case of the actual vehicle, in the case of the slipping wheel the slip moment $\mu N_1 r_1$ again acts acceleratingly upon the vehicle moment of inertia $J_{Kfz}$ through the feedback $M_{R1}$.

the coefficient of adhesion $\mu$, which is dependent on the road surface and on the slip; the tire contact force $N_1$ dependent on driving dynamics; and the beginning and end instants $t_1$, $t_2$ are specified by the operator through the master computer 24b as $M_s = f(\mu N_1 r_1, t)$; see FIG. 1.

If the test subject is constructed without wheels and without brakes, as in the case of the test bench described herein, then the brake can be simulated as well, by having the operator use the master 24b to specify a braking torque set-point value $M_{Br1}(t)$, at a summation point 60 in FIG. 7. When $M_{Br1} > \mu N_1 r_1$, the limitation means respond, and the wheel (right rear wheel) spins until it locks.

If the vehicle is constructed with brakes, as in the case of an laternative test bench structure, then naturally no braking torque need be simulated at the summation point 60. With this construction, the real braking moment $M_{Br1real}$ acts upon the load machine armature, which after all was constructed for the wheel moment of inertia $J_{Wheel}$: $M_{Br1real}$ engages the comparison point 31 in FIG. 7. This real braking moment naturally acts through the simulation circuit precisely upon the vehicle speed as well as on all of the other moments transmitted by the drive shaft. Once again, the limitation means respond if there is an excessive braking moment $M_{Br1real} > \mu N_1 r_1$, so that the simulated wheel begins to slide, until it locks. This prevents the possbility of testing anti-skid systems on the bench.

The simulation method (spinning, locking) described with the right rear wheel as an example may naturally be activated at all wheels in an arbitrary temporal relationship.

The test bench can also be used for two-wheel-drive vehicles. To this end, the non-driving axle is not connected to the associated load machines, and the associated parameters are not set. However, even the non-drivig axle can be coupled with the load machines, and the simulation model can be parameter-set for all four wheels. Then, through the simulation model, the non-driving axle is turned along with the other axle, as occurs with the vehicle on the road. This construction is appropriate, for instance, if an anti-skid or anti-locking braking system (ABS) is to be tested at all four wheels for a two-wheel-drive vehicle.

It is understood that given suitable mechanical adaptation, the complete vehicle can also be installed on the above-described test bench. In that case, instead of the wheels, the load machines are flanged to the test bench.

The foregoing is a description corresponding in substance to German Application P 38 12 824.1, dated Apr. 16, 1988, the International priority of which is being claimed for the instant application, and which is hereby made part of this application. Any material discrepancies between the foregoing specification and the aforementioned corresponding German application are to be resolved in favor of the latter.

I claim:

1. Test bench for testing a drive train of a test vehicle from an internal combustion engine up to drive shafts for wheels, comprising a electronic function element or computer simulating moments of inertia, spring stiffnesses, and damping masses, said electronic function element or computer simulating the wheels and a vehicle acceleration process, with the exception of actually present vehicle components, at least two mutually independent moment-regulated electric load machines serving as a transmission element between said electronic function element or computer and the test bench having the test vehicle, said load machines being flanged directly to the drive shafts of the drive train to be tested, and a integrator having a time constant proportional to the vehicle moment of inertia, said integrator receiving the running resistance moment, reduced by the wheel moments, for picking up the angle speed proportional to the vehicle speed.

2. Test bench according to claim 1, wherein said integrator is a first integrator, and including a second integrator, parallel-connected proportional elements having a gain factor proportional to the tire damping, and a comparison point connected from said first integrator to said second inegrator and said proportional element for summing output signals of said second integrator and said proportional elements to simulate the wheel moment, by reducing the angle speed at said first comparison point by the wheel rpm being fed with a time constant proportional to the tire elasticity and said parallel-connected proportional elements to said second integrator.

3. Test bench according to claim 2, wherein said parallel-connected proportional elements are first proportional elements, and including second proportional elements connected between said first integrator and said comparison point for simulating cornering by the vehicle, said second proportional elements each having different gain factors for wheels on the inside of a curve and wheels on the outside of a curve.

4. Test bench according to claim 2, including proportional elements connected between said first integrator and said comparison point for the simulation of different wheel radii, each of said proportional elements having different gain factors for each individual wheel.

5. Test bench according to claim 2, wherein said comparison point is a first comparison point, and including multipliers connected to said first integrator for the simulation of the kinematic slip, and second comparison points connected to said multipliers for specifying the respective wheel rpm to said first comparison point, said multipliers multiplying a slip separately specifiable for each wheel by the angle speed, and the angle speed in each case being reduced by a product obtained in said second comparison points.

6. Test bench according to claim 2, including limiting elements connected to said second integrator and to said proportional element for the simulation of spinning or locking wheels, by limiting each of the wheel moments.

7. Test bench according to claim 6, wherein a slip moment utilized for limitation is formed as a function of a coefficient of adhesion between the tires and the road surface, the tire contact force and the wheel radius.

* * * * *